Patented Jan. 16, 1940

2,187,347

UNITED STATES PATENT OFFICE 2,187,347

FLEXIBLE METALLIC HOSE

Stephen Guarnaschelli, Elmhurst, N. Y., assignor to Packless Metal Products Corporation, New York, N. Y., a corporation of Delaware Application January 4, 1938, Serial No. 183,295

3 Claims. (Cl. 138—50)

This invention relates to flexible metallic hose, and particularly to flexible metallic corrugated or spiral hose.

Hose of the type mentioned is often subjected to high pressures and also to severe vibrations or pulsations. In order to withstand such severe uses it has been proposed to use a hose formed of heavier material, giving a thicker wall structure. Although hose of this character is more rugged it is also stiffer and cannot be as easily flexed as a hose of lighter material.

This invention has for its salient object to provide a flexible metallic hose so constructed as to withstand high pressures and severe or heavy pulsation or vibration strains, and also so constructed that it can be easily flexed.

Another object of the invention is to provide a flexible metallic hose so constructed as to provide a cushioning effect against high pressures and heavy pulsations.

Another object of the invention is to provide a flexible metallic hose so constructed as to give a multiple protection against breakage and leakage.

Figure 1:
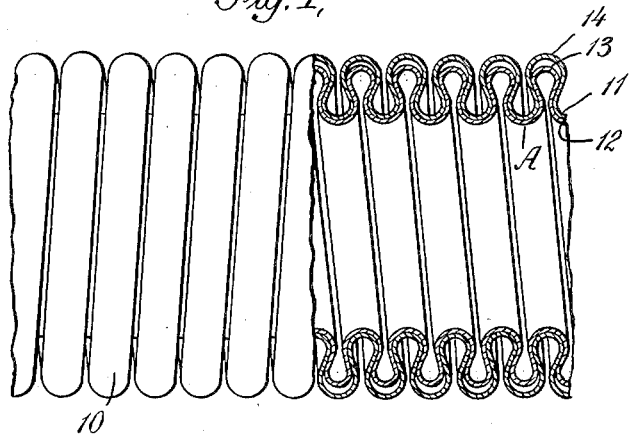
Figure 2:
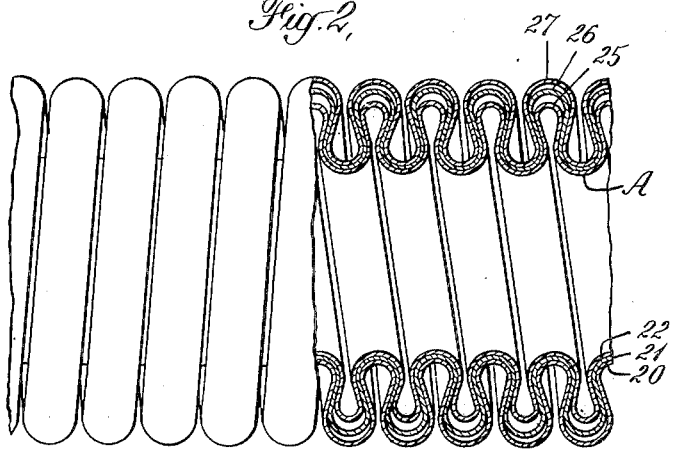

Further objects of the invention will appear from the following specification taken in connection with the drawing which forms a part of this application, and in which Fig. 1 is an elevational view partly in section of a two-ply hose constructed in accordance with the invention; and Fig. 2 is a similar view illustrating a three-ply hose constructed in accordance with the invention.

In the embodiment of the invention illustrated in the drawing there is shown a flexible metallic spiral hose 10 which, as is clearly shown in section, is formed of a pair of spiral tubes 11 and 12.

This hose can be formed in any desired manner, as for instance, by means of the apparatus illustrated in my Patent 2,023,417. In forming the hose the two tubes 11 and 12 are fed into the apparatus, the tube 12 being formed within the tube 11 and the successive convolutions are formed in the manner illustrated in section at the right in Fig. 1. It will be noted that at the inner ends A of the convolutions the loops formed in the two metallic tubes 11 and 12 are in contact, whereas the loops 13 and 14 at the outer ends of the convolutions are spaced apart.

This construction is such that the loops 13 function in the nature of a truss and also form a cushion which partially absorbs the vibrations. Moreover, it is not practical to have the tubes in contact both at the inner and outer loops. As a matter of fact, it is practically impossible to so construct the multiple ply spiral tube. In order to form a multiple ply metal spiral hose or tube, the inner tube must rotate and slip relative to the outer tube due to the difference in diameters of the spiral tubes. If the tubes fit closely one within the other this slip and relative rotation cannot take place and the tubes will break.

Furthermore, the multiple ply tube in which the inner and outer loops of the plies are in contact has very little flexibility and can be bent only with difficulty since the friction between the plies is so great. Another great disadvantage of a spiral multiple ply tube in which the plies are in contact at the inner and outer loops, is that the friction between the plies is so great when the tube is compressed that the tube will break.

Furthermore, a multiple ply corrugated or spiral hose constructed in this manner is much more flexible than a hose having its wall formed of double the thickness of one of the plies or tubes since when the hose is flexed relative movement is permitted between the inner and outer layers or plies, as the outer ply will rub or slide on the inner ply.

Fig. 2 illustrates a multiple ply spiral, flexible, metallic hose comprising three plies 20, 21 and 22. This hose is formed in the manner similar to the hose shown in Fig. 1 and has the same advantages as those above pointed out. In this particular construction it will be noted that the three plies are in contact at the inner ends of the loops, as shown at A, whereas the outer loops 25, 26 and 27 are spaced apart.

It will be obvious that the hose constructed in the manner above described will have greater flexibility than a single ply hose having a wall equal in thickness to the combined thicknesses of the several plies and, furthermore, that greater protection is provided against leakage since a break in the inner ply would not permit the fluid or liquid therein to leak out since the outer ply or plies would prevent such leakage. Also, as above explained, a cushioning action is obtained which tends to absorb and neutralize vibrations or pulsations.

Although certain specific embodiments of the invention have been particularly shown and described, it will be understood that the invention is capable of modification and that changes in the construction and in the arrangement of the various cooperating parts may be made without departing from the spirit or scope of the invention, as expressed in the following claims.

What I claim is:

1. A flexible metallic hose having a multiple thickness corrugated wall comprising a plurality of continuous metallic corrugated tubes disposed one within the other, the inner loops of said corrugations in said tubes being in contact and the outer loops being spaced one within the other, the contacting walls of said tubes between the loops being free to slide on each other.

2. A flexible metallic hose having a plurality of plies, each ply consisting of a continuous spiral metallic tube, said plies being disposed one within the other and with the spiral loops of said plies in registration with each other, the inner loops of said spirals being in contact and the outer loops being spaced apart, the contacting walls of said plies between the loops being free to slide on each other.

3. A flexible metallic hose having a plurality of plies, each ply consisting of a continuous spiral metallic tube, said plies being disposed one within the other and with the spiral loops of said plies in registration with each other, said spiral loops comprising an inner series of loops and an outer series of loops, the loops of the spirals of one series being in contact and the loops of the other series of spirals being spaced apart, the contacting walls of said plies between the loops being free to slide on each other.

STEPHEN GUARNASCHELLI.